(12) United States Patent
Jeffery

(10) Patent No.: US 7,137,567 B2
(45) Date of Patent: Nov. 21, 2006

(54) THERMOSTAT CALIBRATION DEVICE

(76) Inventor: Sack Jeffery, 5521 Ridgebury Dr., Huntington Beach, CA (US) 92649

(*) Notice: Subject to any disclaimer, the term of this patent is extended or adjusted under 35 U.S.C. 154(b) by 0 days.

(21) Appl. No.: 10/869,753

(22) Filed: Jun. 15, 2004

(65) Prior Publication Data

US 2005/0274813 A1    Dec. 15, 2005

(51) Int. Cl.
G05D 23/00    (2006.01)
G01K 15/00    (2006.01)
G01K 19/00    (2006.01)
G01D 18/00    (2006.01)

(52) U.S. Cl. ............................ 236/94; 374/1; 73/1.01
(58) Field of Classification Search ................ 236/94; 374/1; 73/1.01, 157; 324/417
See application file for complete search history.

(56) References Cited

U.S. PATENT DOCUMENTS

| | | | | |
|---|---|---|---|---|
| 3,630,080 A | * | 12/1971 | Taylor | 73/861.64 |
| 3,783,675 A | * | 1/1974 | Kreps | 374/1 |
| 3,902,351 A | * | 9/1975 | Kreps | 374/1 |
| 3,999,434 A | * | 12/1976 | Yen | 374/158 |
| 4,091,670 A | * | 5/1978 | Mantoux | 73/302 |
| 4,591,093 A | * | 5/1986 | Elliott, Jr. | 236/94 |
| 5,803,603 A | * | 9/1998 | Schlueter | 374/1 |

* cited by examiner

*Primary Examiner*—Marc Norman
(74) *Attorney, Agent, or Firm*—Marcia A. Devon

(57) ABSTRACT

A pneumatic thermostat calibration device with a removable cover to protect the sensor needle from clogging and/or damage and the user from needle induced injury. The pneumatic thermostat calibration device should also be sized to fit in the pocket of a user. The pneumatic thermostat calibration device should also include a thermostat adjustment tool. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

8 Claims, 3 Drawing Sheets

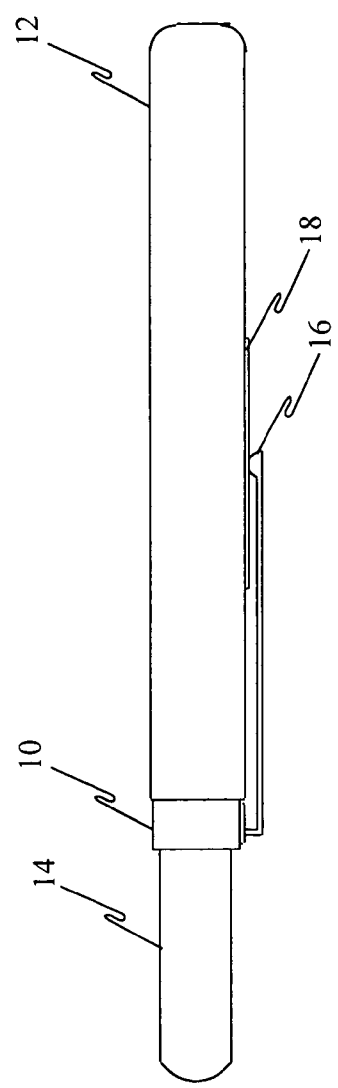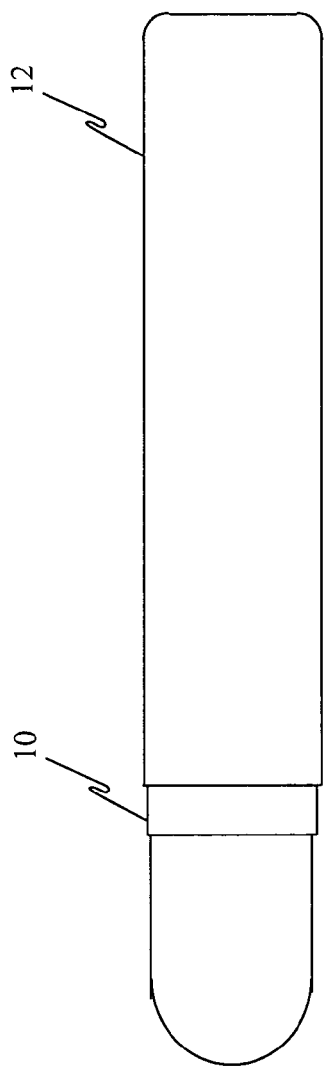
Fig. 1A
Fig. 1B

THERMOSTAT CALIBRATION DEVICE

FIELD OF INVENTION

The present invention relates generally to the field of thermostat calibration and more particularly to a thermostat calibration devices for heating and air-conditioning units in commercial buildings.

BACKGROUND OF THE INVENTION

The environment of commercial, high-rise and low-rise buildings are often controlled by a variable air volume (VAV) box which regulates the air flow within the building. The VAV system includes a controller with an actuator which opens and closes a damper allowing air to flow into the building. The controller modulates the position of the damper by sending a signal to the actuator. The actuator causes the damper to open and close thereby controlling the amount of air flow. The controller receives a signal based on the ambient temperature measured at the thermostat. The ambient temperature is compared to the pre-set, desired temperature and a signal is generated based on the difference between the desired temperature and the actual, measured temperature. The controller responds to the generated signal. The actuator opens or closes the damper in response to the generated signal.

For example, if the ambient air temperature is less than the desired, pre-set temperature, the actuator will open the damper (in one of the system types) thereby allowing the heated or cooled air will flow into the building. There are a number of different types of VAV systems, some of which have the damper normally closed, or normally open. Some VAV systems use hot water reheat to control the VAV. In all of the systems it is important that the ambient temperature be accurately calibrated.

Pneumatic devices are typically used to measure the thermostat pressure. The "spring range" of the actuator is the amount of pressure required to modulate the opening of the actuation. For example, in a normally closed (damper) system, if the ambient temperature is 70 degrees Fahrenheit, the thermostat pressure is 7 psi and the spring ranges are 8–15 psi, i.e. 8–15 psi is required to open the actutator. In a normally open system, the spring ranges are 0–6 psi.

The pneumatic thermostat calibration devices may include a hollow needle attached to a pneumatic sensor. The sensor detects the pneumatic pressure when its needle is inserted into a pneumatic thermostat receiver.

When the control or desired pressure, and the corresponding temperature, of the pneumatic thermostat requires adjustment, a tool is employed to make the adjustment. One of the major drawbacks to the present thermostat calibration devices is that they typically do not include the thermostat adjustment tool with the pressure measuring device and a separate tool must be employed. Further, the different VAV systems which require different types of tools to adjust the different thermostats.

One of the problems encountered with currently-used thermostat calibration devices, is the needle is often vulnerable to clogging and/or damage. Lint, dust and/or other material may clog the sensor rendering it inoperable. The sharp needle may also pose a safety hazard to the user. The unprotected needle may prick or scratch the user when not in use. The unprotected needle is also subject to breakage.

A pneumatic thermostat calibration device with a removable cover to protect the sensor needle from clogging and/or damage and the user from needle induced injury is needed. The pneumatic thermostat calibration device should also be sized to fit in the pocket of a user. There has been a long-standing need for a pneumatic thermostat calibration device which includes a universal thermostat adjustment tool.

SUMMARY OF THE INVENTION

It is an object of the present invention to provide a pneumatic thermostat calibration device with a removable cover to protect the sensor needle from clogging and/or damage and the user from needle induced injury. The thermostat calibration device of the present invention is intended to be readily portable and is sized to fit in the pocket of a user. It is an object of the present invention to provide a pneumatic thermostat calibration device which may be used with different heating and air conditioning systems also include a universal thermostat adjustment tool.

A thermostat calibration device including a housing, a measuring device located in the housing, a probe connected to the measuring device, an output device connected to the measuring device and a cover slideably engaging the housing and covering the probe.

These and other features and advantages of this invention will become further apparent from the detailed description and accompanying figures that follow. In the figures and description, numerals indicate the various features of the invention, like numerals referring to like features throughout both the drawings and description.

BRIEF DESCRIPTION OF THE DRAWINGS

FIG. 1A is a side view of a pneumatic thermostat calibration device according to the present disclosure.

FIG. 1B is a plan view of the pneumatic thermostat calibration device of FIG. 1A.

DETAILED DESCRIPTION

Figure 2:
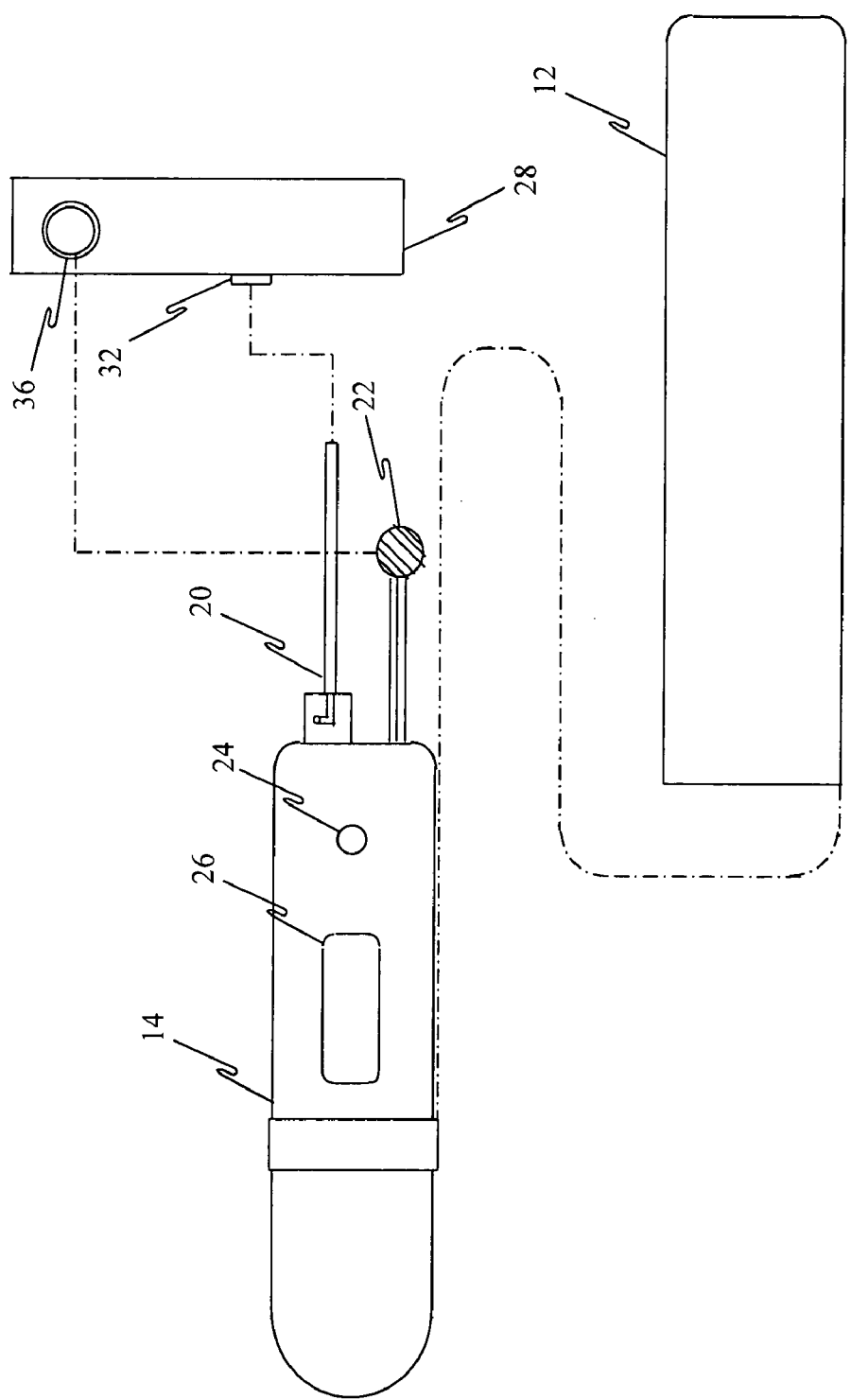
FIG. 2 is a plan view of the pneumatic thermostat calibration device of FIG. 1A with cover 12 removed.

The thermostat calibration device 10 includes a cover 12, a wand 14 and a clip 16 as shown in FIG. 1A. The cover 12 slideably engages the wand 14. The clip 16 may attach device 10 to the material 18. Cover 12 may be fabricated from plastic or other suitable material. The clip 16 may be fabricated from metal, plastic or other suitable material. The material 18 may be the clothing worn by a user or other suitable material or a suitable location.

The cover 12 is slideably removed from device 10 revealing probe 20 and the adjustment tool 22 as shown in FIG. 2. The wand 14 receives pneumatic input from a thermostat through probe 20. The probe 20 includes a hollow needle shape or other suitable shape. The probe 20 engages a receiver 32 in the thermostat 28. Different thermostat 28 types may have different receiver shapes or size as well as different adjustment tools. The probe 20 is preferably interchangeable and may include both an Allen wrench or a screw driver so that it connects to wand 14 to engage various receiver 32 sizes and shapes including different set screws. The probe 20 may be fabricated from metal, carbon epoxy composite, plastic or other suitable material. The adjustment tool 22 is removably connected to wand 14 in a preferred embodiment. The adjustment tool 22 engages a port 36 in the thermostat 28. Adjustment of the port 36 adjusts the thermostat 28 pneumatic pressure or the thermostat controlled temperature setting. The adjustment tool 22 may be fabricated from metal plastic or other suitable material. The wand 14 is activated by a switch 24. After a period of inactivity, the wand 14 turns off automatically. Output from the wand 14 is shown by a display 26. The display 26 may be a liquid crystal display, a CRT display, a mechanical display, a TFT display or other suitable display.

Figure 3:
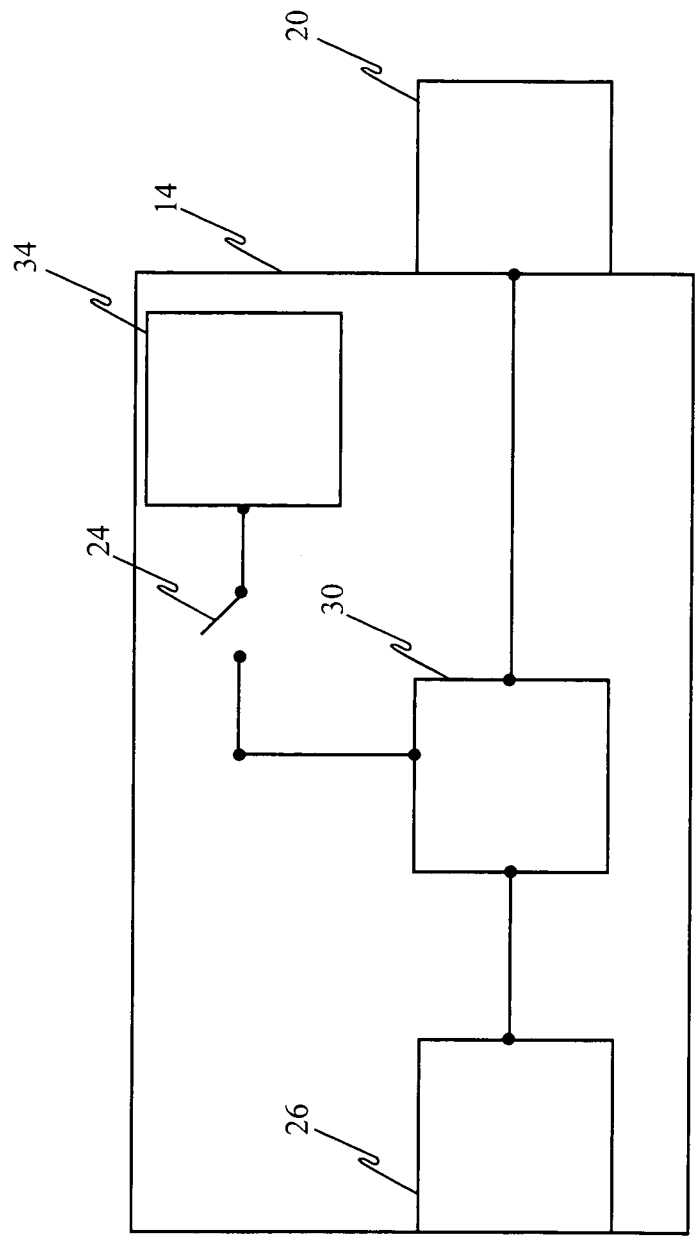
FIG. 3 is a schematic of the pneumatic thermostat calibration device of FIG. 1A.

Input enters the wand 14 through the probe 20, as shown in FIG. 3. Manometer 30 measures pneumatic pressure in thermostat 28 when power is conducted through a closed switch 24 from source 34 and pneumatic pressure is transmitted through probe 20 into manometer 30 from thermostat 28. A manometer 30 measures pressure which is translated to temperature in thermostat 28 when power is conducted through a closed switch 24 from source 34 and heat is transmitted through probe 20 into manometer 30 from thermostat 28. Source 34 is a battery, solar cell or other suitable power source. Manometer 30 may be analog or digital. Output from manometer 30 is conducted to display 26.

The user first measures the ambient air with a thermometer that is preferably included as part of the Thermostat Calibration Device. The probe of the calibration device is inserted into port 36 of the thermostat 28 to obtain a pressure reading. The pneumatic probe obtains a pressure measurement in pounds per square inch and the measurement is shown on the display 26. The skilled technician knows the temperatures which correspond to the pressure readings or a device. Alternatively, a thermometer could be included to measure the temperature directly. The adjustment tool 22 is then inserted into the receiver 32, which is typically a set screw. The set screw is then turned by the tool 22 until the pressure reaches the desired level. Different units require different tools 22. Some units require an Allen wrench, while some require a screwdriver. The preferred embodiment of the present invention includes both tools so that the calibration device is universal. Another embodiment provides the different probes (for example, for a half-dozen systems) which may be installed on the wand to accommodate the different types of thermostats. The Thermostat Calibration Device is designed to operate with spring ranges up to 30 psi and can be used with any of the various types of VAV systems.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims and their equivalents.

What is claimed is:

1. A thermostat calibration device comprising:
   a tubular housing;
   a thermostat adjustment tool connected to the housing;
   the cover slideably engaging the housing and covering the thermostat adjustment tool
   a manometer located in the housing;
   a plurality of probes connected to said manometer; and
   an output device connected to said manometer.

2. The thermostat calibration device according to claim 1 wherein the manometer is pneumatic.

3. The thermostat calibration device according to claim wherein the probe is removably connected to the manometer.

4. The thermostat calibration device of claim 1 further including a clip mounted on said probe.

5. The thermostat calibration device of claim 1 further including attachment means for removably securing the device.

6. The thermostat calibration device of claim 1 further including a display for indicating the pressure.

7. The thermostat calibration device of claim 1 further including a display for indicating the temperature.

8. The thermostat calibration device of claim 1 further including a display for indicating the temperature and pressure.

* * * * *